United States Patent [19]

Masaki et al.

[11] 4,023,359
[45] May 17, 1977

[54] ELECTRONICALLY CONTROLLED EXHAUST GAS PURIFYING SYSTEM

[75] Inventors: Kenji Masaki, Yokohama; Yasuo Nakajima; Hiroyuki Maruoka, both of Yokosuka, all of Japan

[73] Assignee: Nissan Motor Co., Ltd., Yokohama, Japan

[22] Filed: May 6, 1975

[21] Appl. No.: 574,960

Related U.S. Application Data

[63] Continuation-in-part of Ser. No. 379,938, July 17, 1973, abandoned.

[30] Foreign Application Priority Data

July 19, 1972  Japan .............................. 47-72264
July 19, 1972  Japan .............................. 47-72265

[52] U.S. Cl. .................. 60/277; 60/285; 60/289; 123/117 R
[51] Int. Cl.² .................. F01N 3/00; F02B 75/10
[58] Field of Search ............ 60/277, 285, 289; 123/117 R, 117 A, 179 A, 179 B; 340/228 R

[56] References Cited

UNITED STATES PATENTS

| | | | |
|---|---|---|---|
| 3,203,168 | 8/1965 | Thomas .......................... | 60/290 |
| 3,406,515 | 10/1968 | Behrens .......................... | 60/288 |
| 3,680,318 | 8/1972 | Nakajima ........................ | 60/290 |
| 3,732,696 | 5/1973 | Masaki ............................ | 60/286 |
| 3,738,108 | 6/1973 | Goto ............................... | 60/277 |
| 3,826,089 | 7/1974 | Nakajima ........................ | 60/290 |

Primary Examiner—Douglas Hart

[57] ABSTRACT

An electronically controlled exhaust gas purifying system for use with an internal combustion engine of a motor vehicle including not only a catalytic converter but also an auxiliary thermal reactor which is located upstream of the catalytic converter and by which exhaust gases emitted from the engine is re-combusted to the extent that the catalytic converter is not destroyed or damaged by the residual unconsumed compounds in exhaust gases discharged from the thermal reactor. The system is provided with an electronic control means for shutting off the flow of secondary air to be mixed with the exhaust gases emitted from the engine both when at least one of the temperatures of the catalytic converter and the thermal reactor rises above a critical value at which they would be destroyed or damaged, and when the engine is under cranking operation. The electronic control means retards the spark in order to heat the exhaust gases when the temperature of the reactor falls to its reaction commencement temperature. In the event that the rate of temperature rise of the thermal reactor exceeds a threshold value, the electronic control means does not retard the spark even if the temperature of the thermal reactor falls to the reaction commencement temperature, but then retards the spark when the temperature of the thermal reactor falls below a predetermined value which is set lower than that of the reaction commencement temperature.

10 Claims, 4 Drawing Figures

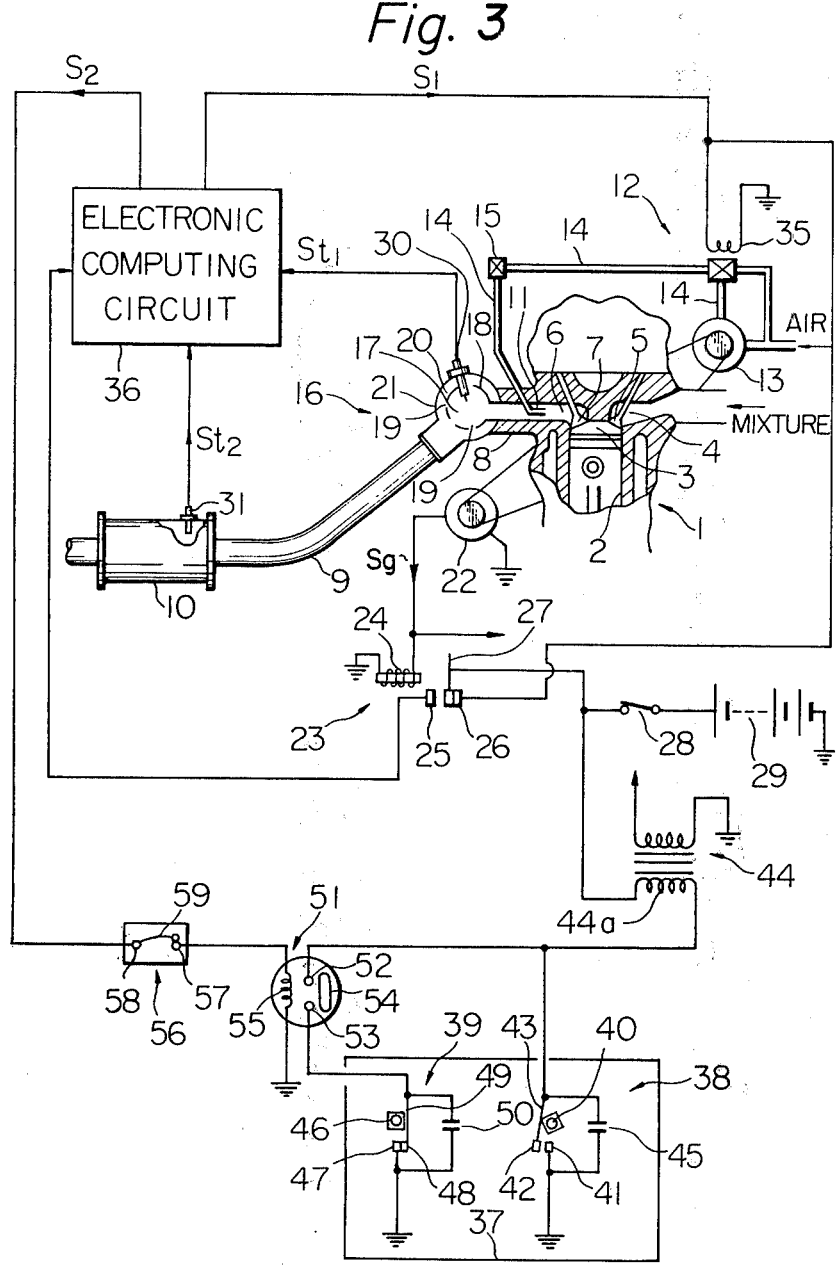

ELECTRONICALLY CONTROLLED EXHAUST GAS PURIFYING SYSTEM

The present application is a continuation-in-part of the co-pending application Ser. No. 379,938 filed July 17, 1973, entitled "Electronically Controlled Exhaust Gas Purifying System", now abandoned.

The present invention is generally concerned with an exhaust system of an internal combustion engine for motor vehicles and, more particularly, with an electronically controlled exhaust gas purifying system for use with an exhaust system of an internal combustion engine for motor vehicles.

The electronically controlled exhaust gas purifying system to which the present invention is directed is specifically of the character which is adapted to oxidize unconsumed noxious compounds such as hydrocarbons (HC) and carbon-monoxides (CO) contained in exhaust gases emitted from the engine and discharged through the exhaust system.

A variety of attempts have thus far been made for the purpose of reducing the concentrations of the unconsumed hydrocarbons and carbon-monoxides in the engine exhaust gases. One useful means to achieve this purpose is to have the exhaust system equipped with a thermal reactor by which the exhaust gases, when passed therethrough, are re-combusted by aid of additional or secondary air introduced through exhaust ports of the exhaust system into the thermal reactor. Another important expedient is to employ a catalytic converter which is also mounted on the exhaust system so as to oxidize the unconsumed noxious compounds in the engine exhaust gases with secondary air before the engine exhaust gases are discharged.

Where only the thermal reactor having a recombustion chamber relatively great in capacity is used with the exhaust system of the engine, the thermal reactor should be internally maintained at an extremely elevated temperature, say of the order of 900° to 1,000°C, in order that the unconsumed noxious compounds in the exhaust gases be burned or oxidized to such concentrations as are acceptable for air-pollution reduction purposes. This makes it necessary to use costly and highly heat-resistive materials to build the thermal reactor. It is, moreover, noted that the efficiency of re-combusting the unconsumed hydrocarbons and carbon-monoxides in the thermal reactor is closely related to air-to-fuel ratios of a combustible mixture to be supplied to the engine, that is, the richer the combustible mixture, the higher is the efficiency of the re-combustion of the unconsumed compounds in the thermal reactor. This brings about a poor economy in fuel consumption. Thus, if only the prior art thermal reactor is used with the exhaust system of the internal combustion engine in order to achieve the air-pollution reduction purposes, serious problems remain to be solved.

Where, on the other hand, only the catalytic converter is incorporated in the exhaust system of the engine, the catalytic converter operates properly if the engine is under normal operation. However, if the engine exhaust gases containing unconsumed noxious compounds such as hydrocarbons (HC) and carbon-monoxides (CO) with extremely high concentrations are introduced into the catalytic converter and the unconsumed noxious compounds are then mixed with additional or secondary air supplied from a secondary air supplying system, the catalytic converter is over-heated by an excessive exothermic reaction of the catalyst at an extremely high temperature, for example, at above 1,000° C, resulting in the catalytic converter being destroyed or damaged. Moreover, such overheating as would destroy or damage the catalytic converter sometimes incurs the destruction of means installing the catalytic converter, causing a fire of the motor vehicle. As is well known, the concentrations of the unconsumed noxious compounds vary under all continuously variable engine operating conditions. That is to say, the concentrations of the unconsumed compounds increase under such undesired engine operating conditions that the engine is under extremely high-load operation, the engine temperature rises abruptly, the engine is markedly overheated, the air-bleed jets of the carburettor are choked, or there occurs a series of misfires in the engine. Under these conditions, thus, the considerably expensive catalytic converter would be destroyed or damaged.

In order to solve the above problem, an exhaust gas purifying system has thus far been proposed to use both the thermal reactor and the catalytic converter in combination in the exhaust system of the engine so as to exploit the combined advantages of them. According to this system, the engine exhaust gases admitted into the exhaust system are primarily re-combusted when passing through the thermal reactor which is mounted on the exhaust system and which is located downstream of the exhaust ports. The exhaust gases entering the thermal reactor are preliminarily mixed with additional or secondary air introduced into the exhaust ports from a secondary air supplying system so as to aid in the re-combustion of the exhaust gases. The exhaust gases are then passed to the catalytic converter which is located downstream of the thermal reactor for thereby being further recombusted to remove the residual unconsumed compounds in the exhaust gases. The engine exhaust gases are thus re-combusted in two consecutive steps so that the exhaust gases need not be heated to an extremely high temperature in the thermal reactor and that considerably leaned exhaust gases are passed to the catalytic converter. The toxic compounds contained in the engine exhaust gases can thus be reduced to concentrations which are far lower than those which would result from an arrangement using the thermal reactor or the catalytic converter independently.

Even if, however, such a system as including both the thermal reactor and the catalytic converter is employed in the exhaust system of the engine, there are occasions when the thermal reactor and the catalytic converter forming parts of the system would be destroyed or damaged by their superheats caused by the unconsumed noxious compounds with remarkably high concentrations, for example, when the choke valve remains inadvertently closed for a long time, or when the vehicle driver is compelled to drive a motor vehicle in spite of a series of misfires occurring in a plurality of cylinders of the engine. It is, in this instance, to be noted that, when the considerably low temperature exhaust gases containing unconsumed noxious compounds with extremely high concentrations are introduced into the thermal reactor under some engine operating conditions, or when unburned gases are introduced into the thermal reactor in the event that there occurs a series of misfires in the engine, the temperature of the thermal reactor falls below its reaction commencement temperature, rendering the thermal reactor inoperative. As a result, a large amount of unconsumed exhaust gases or unburned gases are introduced into the catalytic converter so that the catalytic converter would be destroyed or damaged by the excessive exothermic reaction.

Thus, the prior art exhaust purifying system including both the thermal reactor and the catalytic converter is inadequate and serious problems remain to be solved, so that there is a pressing need for an improved exhaust gas purifying system.

In accordance with the present invention, an improved electronically controlled exhaust gas purifying system is provided in which the exhaust system of the engine includes not only a catalytic converter but also an auxiliary thermal reactor the capacity of which is smaller than that of the prior art thermal reactor. The thermal reactor is located downstream of the exhaust ports of the exhaust system and upstream of the catalytic converter. The engine exhaust gases containing unconsumed noxious compounds admitted into the exhaust system are primarily re-combusted, when passing through the thermal reactor, to such concentrations as are accepted by the catalytic converter, that is, to the extent that the catalytic converter is not destroyed or damaged by the exothermic reaction caused by the residual unconsumed noxious compounds in the exhaust gases discharged through the thermal reactor. The exhaust gases are then passed to the catalytic converter for thereby being further re-combusted to remove the residual unconsumed compounds in the exhaust gases. The engine exhaust gases are thus re-combusted in two consecutive steps so that not only the catalytic converter is reliable in operation but also the catalytic converter is not destroyed or damaged by the residual unconsumed noxious compounds with relatively low concentrations. In the exhaust gas purifying system of the present invention, accordingly, it is possible to raise the total re-combustion efficiency of the system.

Further, the electronically controlled exhaust gas purifying system of the present invention includes an electronic control means which is adapted for preventing the thermal reactor and the catalytic converter from being destroyed or damaged by their superheats caused by the unconsumed noxious compounds with remarkably high concentrations in the exhaust gases emitted from the engine during such abnormal engine operation conditions that the choke valve remains inadvertently closed for a long time, or when the vehicle driver is then compelled to drive a motor vehicle although there occurs a series of misfires in a plurality of cylinders of the engine. The electronic control means functions to control a secondary air supplying system to shut off the flow of additional or secondary air to be mixed with the exhaust gases entering the thermal reactor and the catalytic converter under such abnormal engine operating condition. As a result, the thermal reactor and the catalytic converter are then rendered inoperative so that they are not superheated by the unconsumed noxious compounds with remarkably high concentrations in the exhaust gases. In this electronic control means, the flow of the secondary air is shut off when the temperature of the thermal reactor rises above a critical value, in this case, above 850° C at which the thermal reactor would be destroyed or damaged, and/or when the temperature of the catalytic converter rises above a critical value, in this case, above 750° C at which the catalytic converter would be destroyed or damaged. The secondary air is further shut off during engine cranking operation.

Furthermore, in accordance with the present invention, the electronic control means includes an ignition timing control means for electronically controlling a spark advance mechanism and a spark retard mechanism each forming a distributor. As is known, when the temperature of the thermal reactor falls to its reaction commencement temperature under some engine operation conditions, the thermal reactor is rendered inoperative so that a large amount of the unconsumed noxious compounds are introduced into the catalytic converter, resulting in the catalytic converter being destroyed or damaged. In order to solve this problem, the ignition timing control means functions to actuate the spark retard mechanism, when the temperature of the thermal reactor falls to the reaction commencement temperature, in order to heat the exhaust gases emitted from the engine so that the exhaust gases thus heated are introduced into the thermal reactor, the temperature of which then rises above the reaction commencement temperature, rendering the thermal reactor operative again. The ignition timing control means further includes an engine temperature responsive switch means for actuating the spark advance mechanism during engine warm-up operation.

In addition, in the event that there occurs a series of misfires in a plurality of cylinders of the engine so that the temperature of the thermal reactor falls to the reaction commencement temperature due to unburned gases emitted from engine, if the spark is retarded to heat the unburned gases to be introduced into the thermal reactor, the unburned gases thus heated are abruptly combusted in the thermal reactor by aid of air passed through the misfiring cylinders even if the secondary air is prevented from being introduced into the thermal reactor, so that the thermal reactor would be destroyed or damaged. In order to eliminate this problem, the electronic control means of the present invention does not actuate the spark retard mechanism when the rate of temperature rise of the thermal reactor exceeds a threshold value even if the temperature of the thermal reactor falls to the reaction commencement temperature, but actuate then the spark retard mechanism when the temperature of the thermal reactor falls below a predetermined value which is set lower than that of the reaction commencement temperature.

It is accordingly an object of the present invention to provide an improved electronically controlled exhaust gas purifying system for use with an internal combustion engine of a motor vehicle including not only a catalytic converter but also an auxiliary thermal reactor which is located upstream of the catalytic converter and by which exhaust gases emitted from the engine is re-combusted to the extent that the catalytic converter is not destroyed or damaged by the residual unconsumed compounds in the exhaust gases discharged from the thermal reactor.

Another object of the present invention is to provide an improved electronically controlled exhaust gas purifying system which is capable of prolonging the expected life spans of a thermal reactor and a catalytic converter each forming the system.

Still another object of the present invention is to provide an improved electronically controlled exhaust gas purifying system which is capable of maximizing fuel economy.

A further object of the present invention is to provide an improved electronically controlled exhaust gas purifying system which is highly reliable in operation and can easily installed in various internal combustion engines.

Still a further object of the present invention is to provide an improved electronically controlled exhaust gas purifying which is economical to manufacture.

These and other objects and advantages of the present invention will become more apparent from the following detailed description taken in conjunction with accompanying drawings in which like reference numerals are assigned to corresponding parts and elements and in which:

FIG. 3 is a schematic diagram of an overall configuration of another embodiment of an electronically controlled exhaust gas purifying system according to the present invention.

Figure 1:
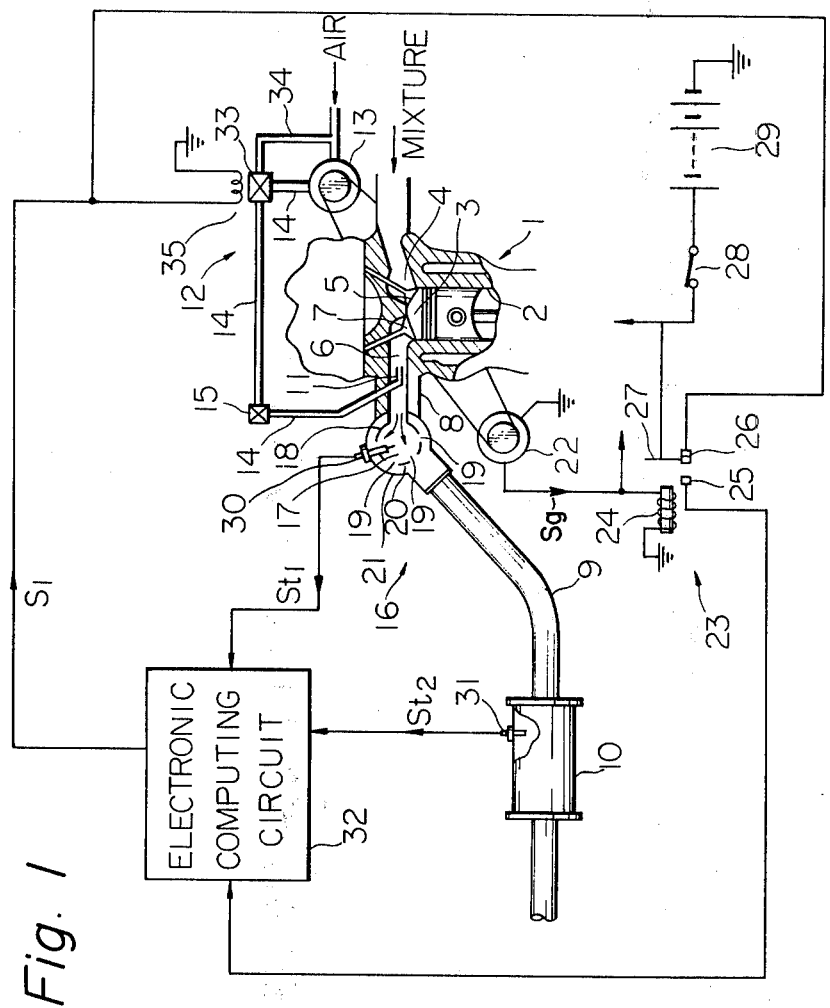
FIG. 1 is a schematic diagram of an overall configuration of one preferred embodiment of an electronically controlled exhaust gas purifying system according to the present invention.

Referring more particularly to FIG. 1, there is shown a first embodiment of an electronically controlled exhaust gas purifying system of the present invention and an exhaust system of an internal combustion engine controlled thereby, the combustion engine generally indicated by a reference numeral 1. The engine 1 comprises a cylinder 2 having therein a combustion chamber 3, an intake port 4 with an intake valve 5 and an exhaust port 6 with an exhaust valve 7. In the drawing, only one cylinder 2 is shown for the sake of simplicity. A reference numeral 8 designates an exhaust manifold which is connected with the exhaust port 6. The exhaust manifold 8 is further connected with an exhaust pipe 9 in which a catalytic converter 10 is mounted. The exhaust port 6 is supplied with additional or secondary air through a nozzle 11 from a secondary air supplying system being generally indicated by a reference numeral 12. The secondary air supplying system 12 includes an air pump 13 driven by the engine 1 and a secondary air supplying pipe 14 with a one-way check valve 15 by which secondary air is introduced through the nozzle 11 from the air pump 13 into the exhaust port 6.

There is mounted in the exhaust manifold 8 an auxiliary thermal reactor of the present invention, generally indicated by a reference numeral 16, which is located downstream of the exhaust port 6. The thermal reactor 16 comprises an inner re-combustion chamber 17 defined by an inner wall 18 which has formed thereon a plurality of apertures 19, and an outer re-combustion chamber 20 defined by an outer wall 21 and the inner wall 18. The inner re-combustion chamber 17 is communicated with the outer re-combustion chamber 20 by apertures 19 of the inner wall 18. The exhaust gases emitted from the engine 1 are introduced through the exhaust manifold 8 into the re-combustion chamber 17 and through the apertures 19 into the outer re-combustion chamber 20 in which the exhaust gases stop for a while until they are discharged into the exhaust pipe 9. The outer re-combustion chamber 20 serves not only to prolong the duration of stay of the exhaust gases in the chamber 20 but also to keep the temperature of the thermal reactor 16 reasonably high and, however, it may be omitted upon occasion. Thus, the exhaust gases in the inner and outer re-combustion chamber 17 and 20 are re-combusted when they are mixed with the secondary air under such conditions that the combustible compounds contained in the exhaust gases are sufficient and that the exhaust gases are overheated, so that the unconsumed noxious compounds contained in the exhaust gases are reduced or removed to such an extent as the catalytic converter 10 would not be destroyed or damaged. In other words, the thermal reactor 16 of the present invention is so designed as to render the catalytic converter 10 properly operative without being destroyed by the residual unconsumed compounds in the exhaust gases thus re-combusted in and discharged from the thermal reactor 16. Accordingly, it should be appreciated that the thermal reactor 16 of the present invention may be smaller in re-combustion capacity than the prior art thermal reactor. In accordance with experiments conducted by the inventor, the re-combustion capacity of the thermal reactor 16 may be 35 to 45 percent of that of the prior art thermal reactor. In other words, the volume of the re-combustion chamber of the prior art thermal reactor must be 100 to 200% on the total volume of the combustion chamber of the internal combustion engine, whereas the volume of the re-combustion chamber of the thermal reactor 16 of the present invention is 35 to 90 percent on the total volume of the combustion chamber of the engine.

The present invention, as mentioned hereinbefore, provides means for preventing the thermal reactor 16 and the catalytic converter 10 from being overheated and accordingly destroyed or damaged caused by the excessive exothermic reaction under such abnormal engine operating conditions that the choke valve remains inadvertently closed for a long time. This will be fully discussed below.

In FIG. 1, a reference numeral 22 is a generator driven by the engine 1 to produce an electric signal Sg which is fed to an electric change-over switch means comprising an electromagnetic relay assembly generally designated by a reference numeral 23. The relay assembly 23 comprises a solenoid 24 energized by the electric signal Sg from the generator 22, a first stationary contact 25, a second stationary contact 26, and a movable contact 27 connected through an ignition switch 28 to an electric power source such as a battery 29 mounted on the vehicle body. The relay assembly 23 is of the type in which the movable contact 27 is normally connected to the second stationary contact 26, as shown. A reference numeral 30 designates a temperature sensor which is mounted on the outer wall 21 of the thermal reactor 16 for sensing the temperature of the thermal reactor 16 and produces an electric thermal reactor temperature analog signal $St_1$, while a reference numeral 31 designates another temperature sensor which is mounted on the catalytic converter 10 for sensing the temperature of the catalytic converter 10 and produces an electric catalytic converter temperature analog signal $St_2$. Both the temperature analog signals $St_1$ and $St_2$ are fed to an electronic computing circuit 32 which produces an electric operating signal $S_1$ when the temperature of the thermal reactor 16 rises above the critical value, in this case, above 850° C at which the thermal reactor 16 would be destroyed or damaged, and/or when the temperature of the catalytic converter rises above the critical value, in this case, above 750° C at which the catalytic converter 10 would be destroyed or damaged.

Figure 2:
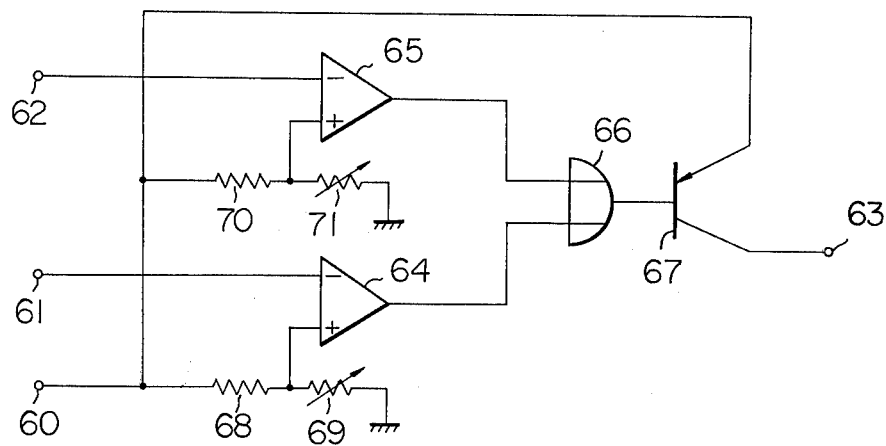
FIG. 2 is an electrical schematic diagram of an electronic computing circuit shown in FIG. 1.

As illustrated in FIG. 2, the electrical computing circuit 32 which has first, second and third input terminals 60, 61 and 62 respectively, and an output terminal 63, comprises first and second comparators 64 and 65 respectively, an OR gate 66 and a transistor 67. In more detail, the first input terminal 60 is connected through the relay assembly 23 to the battery 29, the second input terminal 61 is connected to the temperature sensor 30 of the auxiliary thermal reactor 16 so as to be responsive to the thermal reactor temperature analog signal $St_1$ therefrom, and the third input terminal 62 is connected to the temperature sensor 31 of the catalytic converter 10 so as to be responsive to the catalytic converter temperature analog signal $St_2$ therefrom, while the output terminal 63 produces the operating signal $S_1$. The first comparator 64 has a negative input which is connected to the second input terminal 61, a positive input which is connected to a junction between a resistor 68 and a variable resistor 69, and an output (no numeral). As shown, the resistor 68 and the variable resistor 69 are connected to the first input terminal 60 and grounded respectively. It will be obvious to those skilled in the art that the variable resistor 69 serves to adjust its reference level tobe set in the comparator 64, that is, the critical value of the temperature of the thermal reactor 16. Similarly, the second comparator 65 has a negative input which is connected to the third input terminal 62, a positive input which is connected to a junction between a resistor 70 and a variable resistor 71, and an output (no numeral). The resistor 70 and the variable resistor 71 are connected to the first input terminal 60 and grounded respectively. It is also to be noticed that the variable resistor 71 serves to adjust its reference level to be set in the comparator 65, that is, the critical value of the temperature of the catalytic converter 31. The OR gate 66 has an input which is connected to the output of the first comparator 64, another input which is connected to the output of the second comparator 65, and an output which is connected to a base of the transistor 67, whose emitter is connected to the first input terminal 60 and collector is connected to the output terminal 63. The specific explanations of the operation and function of the OR gate 66 or the transistor 67 can be dispensed with and hence omitted.

On the other hand, the secondary air supplying system 12 includes a three-way valve 33 for feeding the secondary air in a secondary air supplying pipe 14 back into the air pump 13 through a bypass passage 34 in order to shut off the flow of the secondary air to be supplied into the thermal reactor 16 by way of the nozzle 11. The three-way valve 34 is actuated by a solenoid 35 one terminal of which is connected to both the second stationary contact 26 of the relay assembly 23 and the output terminal 63 of the electronic computing means 32, the other terminal grounded.

When, in operation, the ignition switch 28 is closed and the engine 1 is under cranking condition, the generator 22 is not excited to the extent that the electric signal Sg supplied therefrom does not sufficiently energize the solenoid 24. The movable contact 27 remains then connected to the second stationary contact 26 and accordingly the solenoid 35 is energized by the battery 29 so that the three-way valve 33 is actuated so as to shut-off the flow of the secondary air supplied from the air pump 13 into the exhaust port 6 through the nozzle 11. The reason for shutting off the flow of the secondary air during the engine cranking operation is such that, if the engine 1 has to start although it is overheated and then the catalytic converter 10 is operable, the catalyst reacts instantly on the unburned gases by aid of the secondary air, causing such an excessive exothermic reaction as would destroy the catalytic converter 10.

On the other hand, when the engine operation changes from the cranking to the warm-up operations and the generator 22 is excited to the extent that the electric signal Sg energizes the solenoid 24, the movable contact 27 is disconnected to the second stationary contact 26, resulting in the solenoid 35 being deenergized by the battery 29. Therefore, the secondary air is introduced through the nozzle 11 from the air pump 13 into the exhaust port 6. Then, the electronic computing circuit 32 is connected to the battery 29 through the first stationary contact 25 which is connected to the movable contact 27. When the temperature of the thermal reactor 16 rises, in this case, above 850° C as mentioned above, the electronic computing circuit 32 produces from the output 63 the electric operating signal $S_1$ which energizes the solenoid 35 so that the three-way valve 33 is actuated. The secondary air is then prevented from being supplied into the thermal reactor 16. As a result, the temperature of the thermal reactor 16 falls below 850° C so that the thermal reactor 16 would not be destroyed or damaged. Similarly, when the temperature of the catalytic converter 10 rises, in this case, 750° C, as mentioned above, the electronic computing circuit 32 produces from the output 63 the electric operating signal $S_1$ which energizes the solenoid 33 so that the three-way valve 34 is actuated.

Reference is now made to FIG. 3 in which there is shown another embodiment of the electronically controlled exhaust gas purifying system including an ignition timing control means which is adapted to heat the exhaust gases emitted from the engine 1 when the temperature of the thermal reactor 16 falls below its reaction commencement temperature under some engine operating conditions.

An electronic computing circuit 36 shown in FIG. 3 functions essentially similarly to the electronic computing circuit 32 except that the electronic computing circuit 36 further produces another electric operating signal $S_2$ when the temperature of the thermal reactor 16 falls to the reaction commencement temperature, in this case, 650° C.

Figure 4:
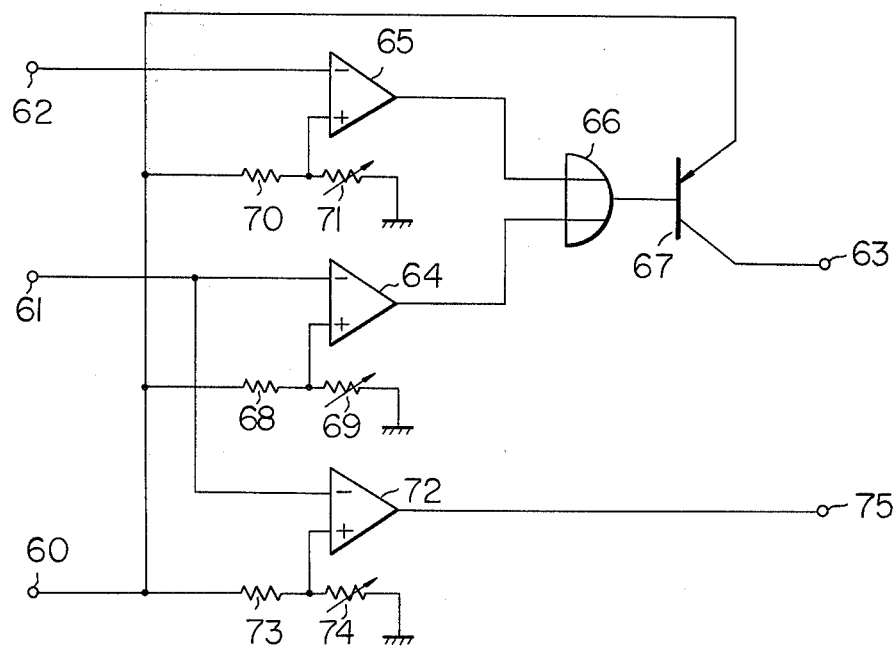
FIG. 4 is an electrical schematic diagram of an electronic computing circuit shown in FIG. 3.

As shown in FIG. 4, the electronic computing circuit 36 further comprises a third comparator 72 having a negative input which is connected to the second input terminal 61 of the circuit 32, a positive input which is connected to a junction between a resistor 73 and a variable resistor 74, and an output which is connected to another output terminal 75 of the circuit 32 from which the operating signal $S_2$ is produced. Similarly, it is to be noticed that the variable resistor 74 serves to adjust its reference level to be set in the comparator 72, that is, the reaction commencement temperature of the thermal reactor 16.

A reference numeral 37 designates a distributor which includes a spark advance mechanism 38 and a spark retard mechanism 39. The spark advance mechanism 38 includes a breaker cam 40, a stationary contact point 41 connected to the ground, and a movable contact point 42 carried on a movable contact arm 43.

The movable contact arm 43 is connected to the primary coil side 44a of the ignition coil 44 and also connected to a capacitor 45 having one end grounded. Likewise, the spark retard mechanism 39 includes a breaker cam 46, a stationary contact point 47 connected to the ground, and a movable contact point 48 carried on a movable contact arm 49. The movable contact arm 49 is connected to a capacitor 50 having one end grounded. This movable contact arm 49 is also connected to the primary coil side 44a of the ignition coil 44 through an electromagnetic relay assembly 51. The relay assembly 51 comprises two stationary contacts 52 and 53, the contact 52 being connected to the primary coil side 44a of the ignition coil 44 while the contact 53 is connected to spark retard mechanism 39, a movable contact 54 and a solenoid 55 which, when energized, closes the relay assembly 51. The solenoid 55 has one terminal grounded, and the other connected through an engine temperature responsive switch 56 to the electronic computing circuit 36. The engine temperature responsive switch 56 may be of any conventional construction and, in the illustrated embodiment, comprises two stationary contacts 57 and 58 and a movable contact 59. The contact 57 is connected to the solenoid 55 of the relay assembly 51, while the contact 58 is connected to the electronic computing circuit 36. The movable contact 59 is arranged to close the stationary contacts 57 and 58 when the engine temperature represented by such as the temperature of the coolant in the water jacket (not shown) formed in the engine body is low.

When, in operation, the temperature of the thermal reactor 16 falls below the reaction commencement temperature, the electronic computing circuit 36 produces from the output 75 the electric operating signal $S_2$ which is fed to the relay assembly 51 through the engine temperature responsive switch 56 so that the solenoid 55 is then energized, resulting in the contacts 52 and 53 being connected with each other. Thus, the spark retard mechanism 39 is actuated and accordingly the spark is retarded so that the exhaust gases emitted from the engine is fully heated and introduced into the thermal reactor 16 the temperature of which then rises above the reaction commencement temperature, rendering the thermal reactor 16 operative again.

It is to be appreciated, as mentioned above, that the electronic computing circuit 36 does not produce the electric operating signal $S_2$ when the rate of temperature rise of the thermal reactor 16 exceeds a threshold value even if the temperature of the thermal reactor 16 falls to the reaction commencement temperature, i.e., 650° C, but produces then the electric operating signal $S_2$ when the temperature of the thermal reactor 16 falls below a predetermined value, in this case, below 450° C, which is set lower than 650° C.

While the principles of the present invention have been described above in connection with specific embodiments, it is to be clearly understood that this description is made only by way of example and not as a limitation on the scope of the present invention.

What is claimed is:

1. In an internal combustion engine for a motor vehicle having at least one combustion chamber, an exhaust system through which exhaust gases emitted from said engine are discharged, said exhaust system including an exhaust port opening to said combustion chamber, an exhaust manifold and an exhaust pipe connected with said exhaust manifold, a secondary air supplying system including an air pump and a secondary air supplying pipe with a oneway check valve for supplying a secondary air from said air pump into said exhaust port through a nozzle, a generator driven by said engine, and a distributor including a spark advance mechanism and a spark retard mechanism, an electronically controlled exhaust gas purifying system comprising, in combination:

a catalytic converter mounted in said exhaust pipe;
an auxiliary thermal reactor mounted in said exhaust manifold and located upstream of said catalytic converter for primarily re-combusting unconsumed noxious compounds contained in said exhaust gases to the extent that the residual unconsumed noxious compounds contained in exhaust gases discharged from said thermal reactor are acceptable to said catalytic converter; and
an electronic control means for electronically controlling said secondary air supply system to prevent said secondary air from being supplied into said exhaust port under at least one of the following conditions, one being that at least one of the temperatures of said thermal reactor and said catalytic converter is above a critical value at which said thermal reactor and said catalytic converter would be destroyed, the other being that said engine is under cranking operation,
said electronic control means comprises an electric power source; first temperature detection means mounted on said thermal reactor for detecting the temperature of said thermal reactor to produce an electric thermal reactor temperature analog signal; second temperature detection means mounted on said catalytic converter for detecting the temperature of said catalytic converter to produce an electric catalytic converter temperature analog signal; electronic computing circuit connected to said power source to be energized thereby and responsive to at least one of said electric thermal temperature analog signal and said catalytic converter temperature analog signal to produce a first electric operating signal when at least one of the temperatures of said thermal reactor and said catalytic converter rises above said critical value; three-way valve means disposed in said seconday air supplying pipe for preventing said secondary air in said secondary air supplying pipe from being supplied into said exhaust port to feed said secondary air back into said air pump; electric actuating means for actuating said three-way valve means when said actuating means is energized; and electric changeover switch means for disconnecting said electronic computing circuit with said power source and connecting said actuating means with said power source to actuate said three-way valve means by means of said power source when said engine is under cranking operation.

2. In an internal combustion engine as claimed in claim 1, said electronic computing circuit comprises a first comparator having a first input to be responsive to said electric thermal reactor temperature analog signal from said first temperature detection means, a second input connected to said power source to be energized thereby, and an output; a second comparator having a first input to be responsive to said electric catalytic converter temperature analog signal from said second temperature detection means, a second input connected to said power source to be energized thereby, and an output; an OR gate having an input connected to the output of said first comparator, another input connected to the output of said second comparator, and an output; and a transistor whose base is connected to the output of said OR gate, emitter is connected to said power source, and collector is connected to said electrical actuating means.

3. In an internal combustion engine as claimed in claim 2, either of said second input of the first and second comparators is grounded through a variable resistor to thereby adjust its reference level to be set therein.

4. In an internal combustion engine as claimed in claim 1, said electronic computing circuit of said electronic control means further produces a second electric operating signal when said thermal reactor temperature falls to the reaction commencement temperature.

5. In an internal combustion engine as claimed in claim 4, said electronic computing circuit comprises a first comparator having a first input to be responsive to said electric thermal reactor temperature analog signal from said first temperature detection means, a second input connected to said power source to be energized thereby, and an output; a second comparator having a first input to be responsive to said electric catalytic converter temperature analog signal from said second temperature detection means, a second input connected to said power source to be energized thereby, and an output; a third comparator having a first input to be responsive to said thermal reactor temperature analog signal, a second input connected to said power source to be energized thereby, and an output from which said second electric operating signal is produced; an OR gate having an input connected to the output of said first comparator, another input connected to the output of said second comparator, and an output; and a transistor whose base is connected to the output of said OR gate, emitter is connected to said power source, and collector is connected to said electrical actuating means.

6. In an internal combustion engine as claimed in claim 5, each of the second inputs of the first, second and third comparators is grounded through a variable resistor to thereby adjust its reference level to be set therein.

7. In an internal combustion engine as claimed in claim 1, said electrical actuating means comprises a solenoid.

8. In an internal combustion engine as claimed in claim 1, said electric change-over switch means comprises an electromagnetic relay assembly including a solenoid; a first stationary contact connected to said electronic computing circuit; a second stationary contact connected to said actuating means; and a movable contact connected to said power source and adapted for connecting said second stationary contact with said power source to actuate said three-way valve means when said solenoid is energized by an electric signal from said generator during enginecranking operation.

9. In an internal combustion engine as claimed in claim 4, said electronic control means further comprises ignition timing control means including an electromagnetic relay energized by said second electric operating signal for actuating said spark retard mechanism of said distributor to raise the temperature of said exhaust gases.

10. In an internal combustion engine as claimed in claim 9, said ignition timing control means further includes engine temperature responsive switch means for actuating said spark advance mechanism during engine warm-up operation.

* * * * *